(12) United States Patent
Luo et al.

(10) Patent No.: US 10,171,170 B2
(45) Date of Patent: Jan. 1, 2019

(54) MULTI-CHANNEL PARALLEL OPTICAL TRANSCEIVER MODULE

(71) Applicant: Global Technology Inc., Ningbo (CN)

(72) Inventors: Jian-Hong Luo, Ningbo (CN);
Chao-Hung Tsai, New Taipei (TW);
Che-Shou Yeh, New Taipei (TW);
Lai-Wei Lu, Ningbo (CN)

(73) Assignee: Global Technology Inc., Ningbo (CN)

( * ) Notice: Subject to any disclaimer, the term of this patent is extended or adjusted under 35 U.S.C. 154(b) by 124 days.

(21) Appl. No.: 15/388,502

(22) Filed: Dec. 22, 2016

(65) Prior Publication Data

US 2017/0187462 A1 Jun. 29, 2017

(30) Foreign Application Priority Data

Dec. 23, 2015 (CN) .......................... 2015 1 0981312

(51) Int. Cl.
*G02B 6/42* (2006.01)
*H04B 10/40* (2013.01)

(52) U.S. Cl.
CPC ............. *H04B 10/40* (2013.01); *G02B 6/425* (2013.01); *G02B 6/4206* (2013.01); *G02B 6/428* (2013.01); *G02B 6/4246* (2013.01); *G02B 6/4257* (2013.01); *G02B 6/4285* (2013.01); *G02B 6/4286* (2013.01); *G02B 6/4292* (2013.01)

(58) Field of Classification Search
CPC ...... G02B 6/42; G02B 6/4201; G02B 6/4204; G02B 6/4206; G02B 6/421; G02B 6/4246; G02B 6/425; G02B 6/4256; G02B 6/4257; G02B 6/4277; G02B 6/428; G02B 6/4285; G02B 6/4286; G02B 6/4292; H04B 10/40

See application file for complete search history.

(56) References Cited

U.S. PATENT DOCUMENTS

| | | | | |
|---|---|---|---|---|
| 6,840,686 | B2 * | 1/2005 | Jiang ..................... | G02B 6/4204 385/92 |
| 7,116,912 | B2 * | 10/2006 | Pang ..................... | G02B 6/4201 398/139 |
| 8,967,881 | B2 * | 3/2015 | Teo ....................... | G02B 6/4201 385/88 |
| 9,557,500 | B1 * | 1/2017 | Luo ....................... | G02B 6/4246 |
| 2004/0033032 | A1 * | 2/2004 | Nakanishi ............ | G02B 6/02123 385/92 |
| 2004/0037537 | A1 * | 2/2004 | Chown ................. | G02B 6/4204 385/140 |

(Continued)

*Primary Examiner* — John Lee
(74) *Attorney, Agent, or Firm* — Grossman Tucker Perreault & Pfleger, PLLC

(57) ABSTRACT

The present disclosure provides a multi-channel parallel optical transceiver module. The disclosed optical transceiver module/device may include a shell body and a circuit board located in the shell body, and an optical emitter base soldered to a first end of the circuit board. A notch located on the base, for engaging the first end of the circuit board, and the optical emitter base engaged with the first end of the circuit board may be soldered to two sides of the circuit board. The optical emitters may be disposed in parallel on the base, and separated from each other by a block. A lens and a laser may be disposed at a first side of each of the optical emitters that is adjacent to the circuit board, and an optical monitor may be disposed on a second end of the circuit board adjacent to the laser.

4 Claims, 5 Drawing Sheets

(56) References Cited

U.S. PATENT DOCUMENTS

| | | | | |
|---|---|---|---|---|
| 2006/0045436 A1* | 3/2006 | Wang | G02B 6/4204 | 385/92 |
| 2012/0057879 A1* | 3/2012 | Douma | G02B 6/4246 | 398/135 |
| 2012/0219256 A1* | 8/2012 | McColloch | G02B 6/4206 | 385/88 |
| 2012/0263416 A1* | 10/2012 | Morioka | G02B 6/4214 | 385/33 |
| 2012/0301152 A1* | 11/2012 | Edwards | G02B 6/4201 | 398/135 |
| 2013/0156418 A1* | 6/2013 | Stapleton | H04B 10/40 | 398/25 |
| 2013/0163917 A1* | 6/2013 | Amirkiai | G02B 6/4201 | 385/14 |
| 2013/0163938 A1* | 6/2013 | Wang | G02B 6/3817 | 385/89 |
| 2014/0126917 A1* | 5/2014 | Sato | H04B 10/40 | 398/182 |
| 2014/0314422 A1* | 10/2014 | Shao | H04B 10/40 | 398/138 |
| 2016/0131843 A1* | 5/2016 | Amit | G02B 6/4221 | 385/24 |
| 2016/0192545 A1* | 6/2016 | Mao | H05K 9/0058 | 398/136 |
| 2016/0291270 A1* | 10/2016 | Wang | G02B 6/4277 | |
| 2017/0031117 A1* | 2/2017 | Nagarajan | H04B 10/40 | |
| 2017/0090132 A1* | 3/2017 | Nagarajan | H04B 10/40 | |
| 2017/0093124 A1* | 3/2017 | Nagarajan | H04B 10/501 | |
| 2017/0168252 A1* | 6/2017 | Pezeshki | G02B 6/4246 | |
| 2017/0187462 A1* | 6/2017 | Luo | G02B 6/4206 | |
| 2018/0062756 A1* | 3/2018 | Ho | H04B 10/572 | |
| 2018/0164515 A1* | 6/2018 | Amit | G02B 6/4214 | |

\* cited by examiner

MULTI-CHANNEL PARALLEL OPTICAL TRANSCEIVER MODULE

TECHNICAL FIELD

The present disclosure relates to fiber optical communications, and more particularly, to multi-channel parallel optical transceiver module.

BACKGROUND

In the optical communication field, the optical transceiver module is presently a core module of the optical communication network. With the increased demand of the transmission bandwidth and transmitting speed, the optical transceiver module has been developed for being smaller in size and higher in integration density, and with multiple channels. In many circumstances, it is necessary to design an optical transceiver module with multi-channel and parallel optical designs.

Currently, an optical device and a circuit board are separated in the multi-channel parallel optical transceiver modules, and the optical device is connected to the circuit board by a flexible print circuit. However, the above approach is more expensive and requires longer signal wires, which may negatively affect the quality of high speed signals and make more difficult achieving the ideal transmission.

SUMMARY

The present disclosure overcomes the currently existing technical drawback. The present disclosure provides a multi-channel parallel optical transceiver module, which is smaller in size with the reduced manufacturing cost, shorter signal wires, and better transmission.

The present disclosure provides a multi-channel parallel optical transceiver module having a shell body and a circuit board located in the shell body. The transceiver module may further include an optical emitter base soldered to an end of the circuit board. A notch located on the optical emitter base, for engaging one end of the circuit board, and the optical emitter base engaged with the end of the circuit board may be soldered to two opposite sides of the circuit board. The optical emitter may be adjacent to the circuit board, and an optical monitor may be disposed on the end of the circuit board adjacent to a laser. The optical monitor may be connected to the laser by a bonding wire. A laser controller and a driving chip may be further disposed on the circuit board, and connected to the optical monitor and the laser. An optical fiber array and a processing chip for received optical signals may be adhered onto the circuit board, and a first metal shielding mask disposed on the circuit board may be used for covering and sealing the optical fiber array and the processing chip for the received optical signal. A second metal shielding mask disposed on the circuit board may be for covering and sealing the first metal shielding mask, the optical monitor, the laser controller, and the driving chip.

With the aforementioned structure, the present disclosure has features as following. First, the optical emitter base may be soldered directly onto the circuit board, to minimize the distance between the laser on the base and the circuit board and therefore to require shorter signal wires. With the shortened length of the bonding wires, better high frequency signal transmission may be achieved. Secondly, all the chips are disposed on the circuit board, enabling the optical device to be including the laser without any chips equipped. As such, any control over the chips may be implemented through the circuit board, both simplifying the manufacturing processes and improving the quality of products. Thirdly, a flexible circuit board between the optical device and the circuit board may be no longer necessary, resulting in less usage of the space and improving the efficiency of the production when the preparation of the optical receiving module and the optical emitter module may be finalized on the circuit board.

Each of the optical emitters on the base may be associated with the laser and the lens located at the side adjacent to the circuit board, and a fiber pigtail disposed at the other side far from the circuit board. An optical isolator may be disposed at the end of the fiber pigtail adjacent to the lens, a ferrule may be disposed in the fiber pigtail, and an optical fiber may be disposed in the ferrule. Light is emitted from the laser and then passes through the lens and the optical isolator before coupling to the optical fiber located in the fiber pigtail. The coupling process may be implemented on the base.

The adjacent fiber pigtails on the base may be different in length so as to prevent one fiber pigtail from being touched by a robotic arm when the robotic arm picks another fiber pigtail during the coupling process. The distance between the fiber pigtails on each light path in the present disclosure may be shortened with the structure according to the present disclosure. During the coupling process, the fiber pigtails having the shorter length may be coupled first, before the fiber pigtails having the longer length are coupled during the coupling process, therefore minimizing the occurrence of the fiber pigtail being touched by another fiber pigtail.

The laser controller and the driving chip may be implemented by a chip of clock data recovery and laser driving, and the processing chip of the received optical signals may be implemented by a chip of clock data recovery and amplification of the received optical signals. The number of the chips can be reduced as the result.

BRIEF DESCRIPTION OF THE DRAWINGS

The present disclosure will become more understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
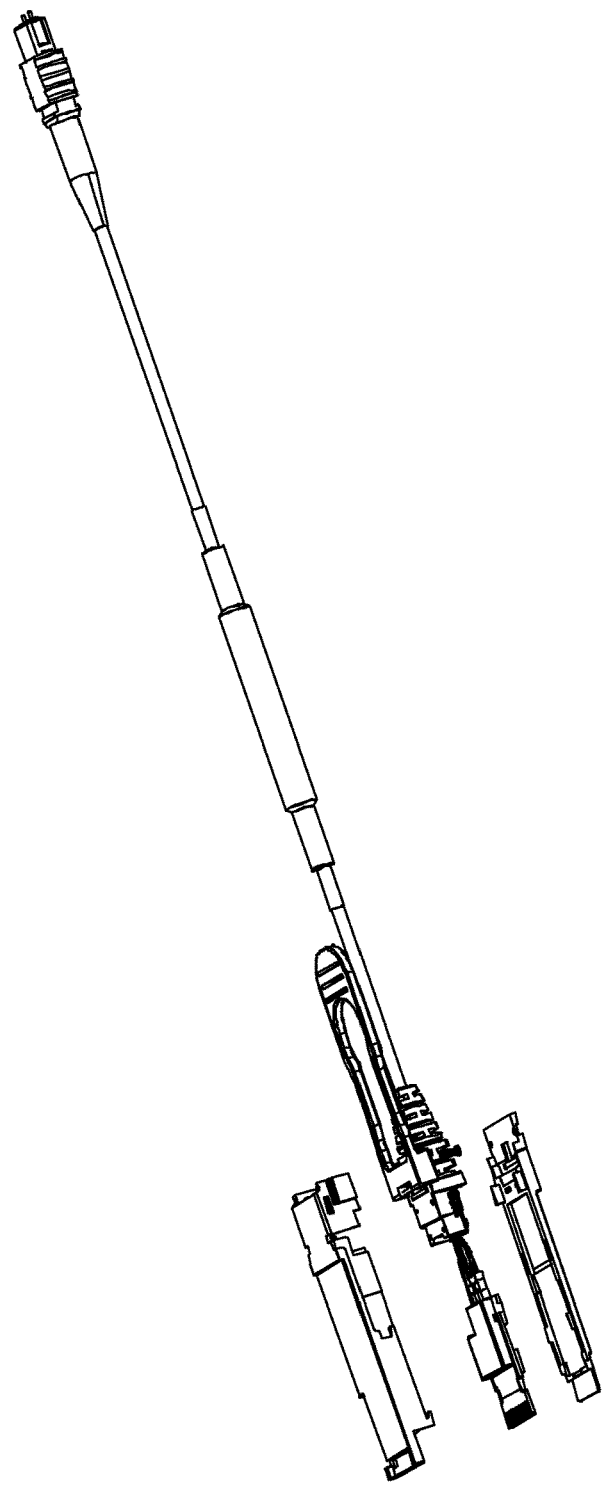
FIG. 1 shows structure of an optical transceiver device according to one embodiment of the present disclosure.
Figure 2:
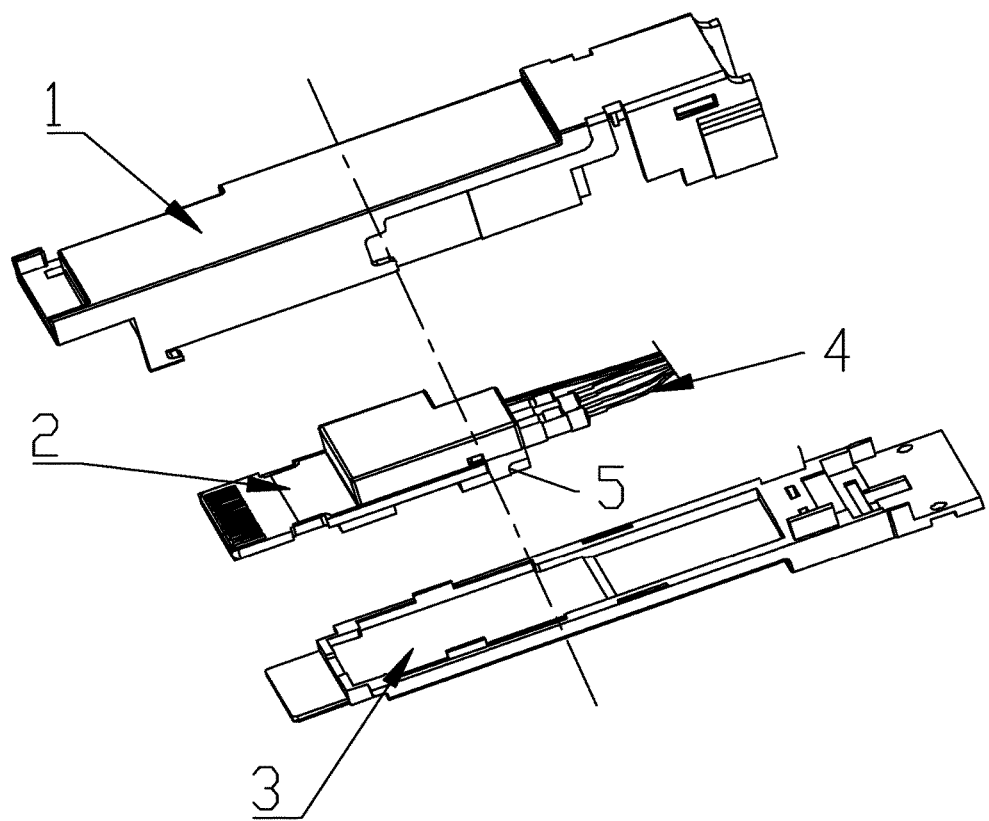
FIG. 2 shows the structure of the optical transceiver device according to one embodiment of the present disclosure.
Figure 3:
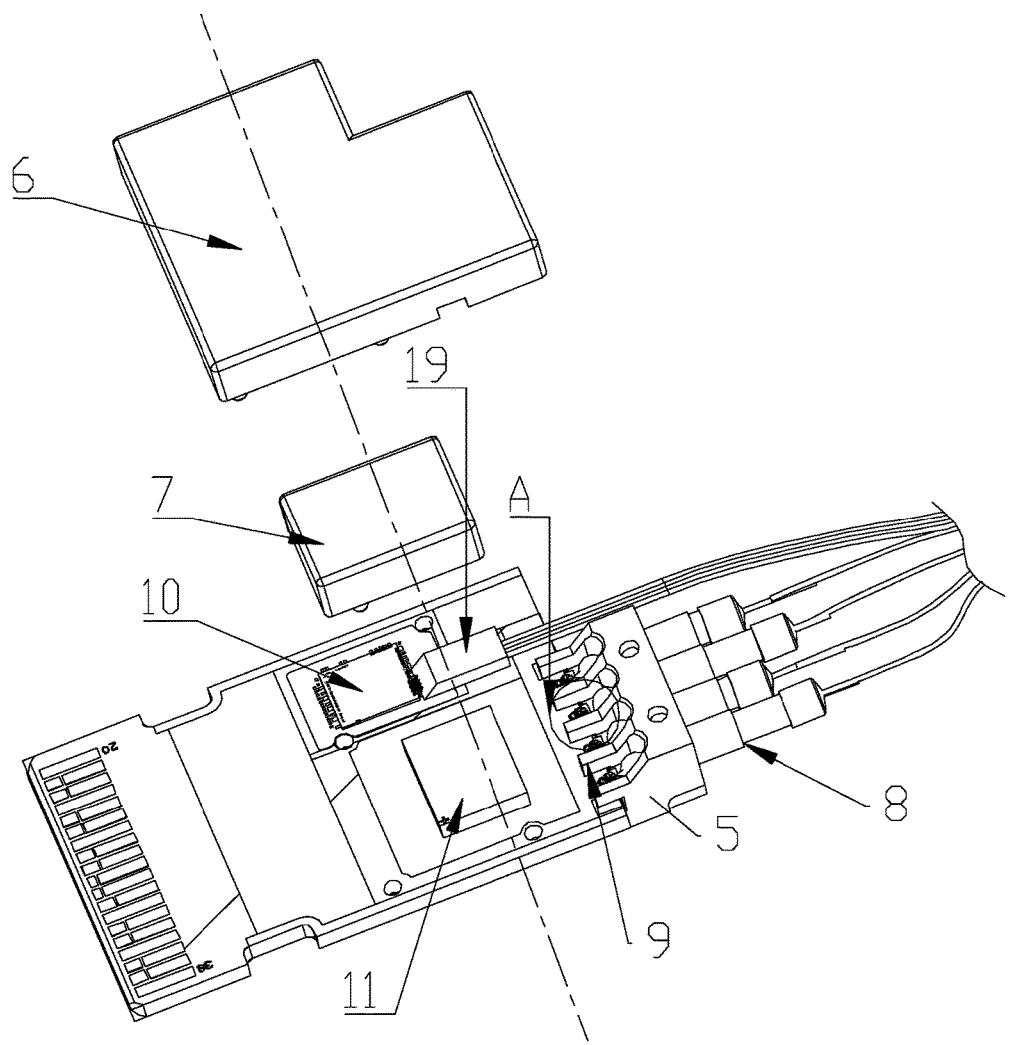
FIG. 3 shows a part of a circuit board of the optical transceiver device according to one embodiment of the present disclosure.
Figure 4:
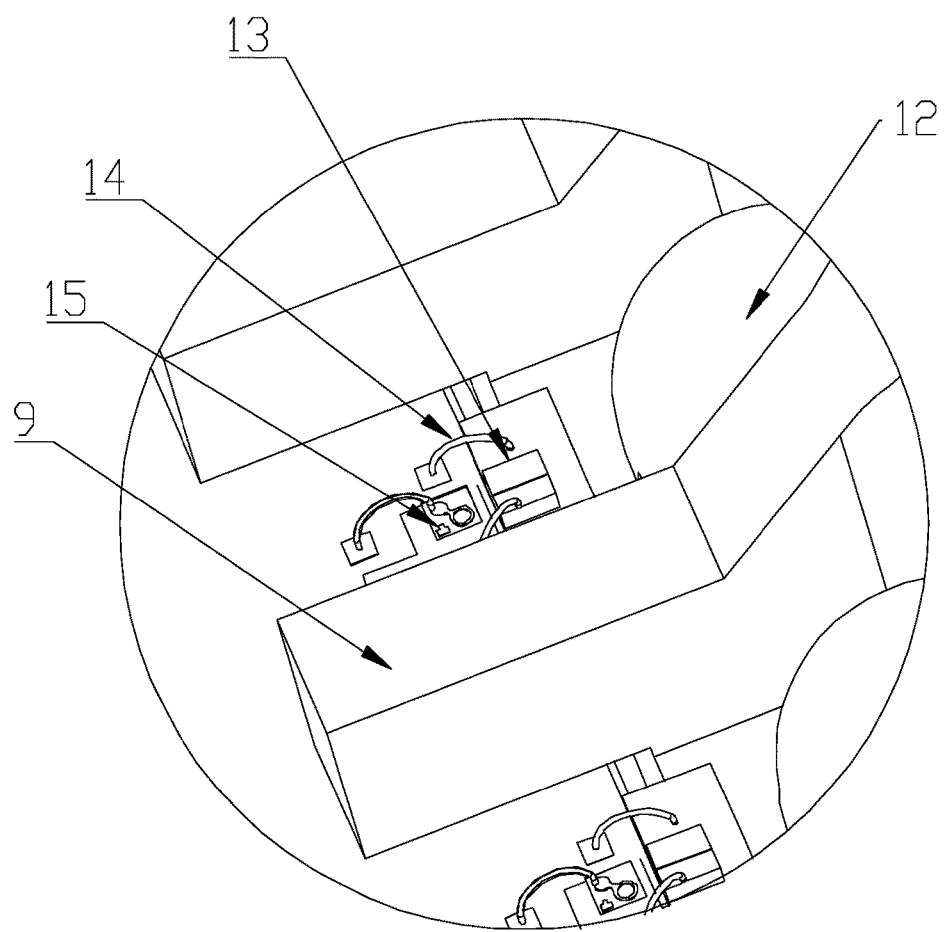
FIG. 4 shows detailed structure of portion A in FIG. 3.

Please refer to FIG. 1 to FIG. 5. The present disclosure provides a multi-channel parallel optical transceiver module including a shell body and a circuit board 2 located in the shell body. In this embodiment, the shell body includes a top shell 1 and a bottom shell 3, and the top shell 1 and the bottom shell 3 together may form the shell body. FIG. 1 shows structure of an optical transceiver device according to one embodiment of the present disclosure. The optical transceiver device may further include an optical fiber connection terminal and an optical fiber 18.

The multi-channel parallel optical transceiver device may further include a base 5 of an optical emitter soldered to an end of the circuit board 2, and a notch is located on the base 5, for engaging with one end of the circuit board 2. The base 5 engaged with the end of the circuit board 2 may be soldered to two opposite sides of the circuit board 2, so that the base 5 may be reliably secured to the circuit board 2.

The optical emitters may be disposed in parallel on the base 5, and separated from each other by blocks 9. A lens 12 and a laser 13 may be disposed at a side of each of the optical emitters that is adjacent to the end of the circuit board 2. In this embodiment, there are four optical emitters disposed in parallel on the base 5, and each of the optical emitters is separated from each other by the block 9. Thus, the optical emitters will not interfere with each other in operation. Each of the plurality of optical emitters may be associated with the lens 12 and the laser 13, both of which may be disposed on the base 5. The light emitted from the laser 13 may pass through the lens 12 and an optical isolator 16 before coupling with the optical fiber 18 in a fiber pigtail 8.

An optical monitor 15 may be disposed on the end of the circuit board 2 adjacent to the laser 13, and the optical monitor 15 and the laser 13 may be connected by bonding wires 14. The length of the bonding wires 14 is related directly to the attenuation. In the present disclosure, the bonding wires 14 may be also very short so as to have better high speed signal transmission.

A chip of clock data recovery and laser driving chip (CDR+LDD) 11 may be further disposed on the circuit board 2, and connected to the optical monitor 15 and the laser 13. Further, the laser 13 may be connected to the chip of clock data recovery and laser driving (CDR+LDD) 11 by the bonding wires 14. An optical fiber array 19 and a chip of clock data recovery and amplification of received optical signal (CDR+TIA) 10 may be further adhered onto the circuit board 2. In this embodiment, the optical fiber array 19 is an optical fiber array with a 45-degree end face, and the light propagating in the optical fiber 18 is reflected by the optical fiber array 19 to an array of photodiodes below the optical fiber array 19 with the 45-degree end face. The array of photodiodes may be connected to the chip of clock data recovery and amplification of received optical signal (CDR+TIA) 10. A first metal shielding mask 7 may be disposed on the circuit board 2 for covering and sealing the optical fiber array 19 with the 45-degree end face, the chip of clock data recovery and amplification of received optical signal (CDR+TIA) 10, and the array photodiodes. Besides, a second metal shielding mask 6 may be further disposed on the circuit board 2 for covering and sealing the first metal shielding mask 7, the optical monitor 15, and the chip of clock data recovery and laser driving (CDR+LDD) 11. The optical receiving part and the optical emitting part on the circuit board 2 may be separated from each other by the shielding mask to avoid the potential interference between them.

The optical emitters in the base 5 may include the laser 13 and the lens 12 located at the side adjacent to the circuit board 2, and a fiber pigtail 8 may be disposed at another side far from the circuit board 2. An optical isolator 16 may be disposed at the end of the fiber pigtail 8 adjacent to the lens 1. The fiber pigtail may further include a ferrule 17 and an optical fiber 18 disposed into the ferrule 17. The light is emitted from the laser 13 and passes through the lens 12 and the optic isolator 16 before coupling to the optical fiber 18 located in the fiber pigtail 8.

Figure 5:
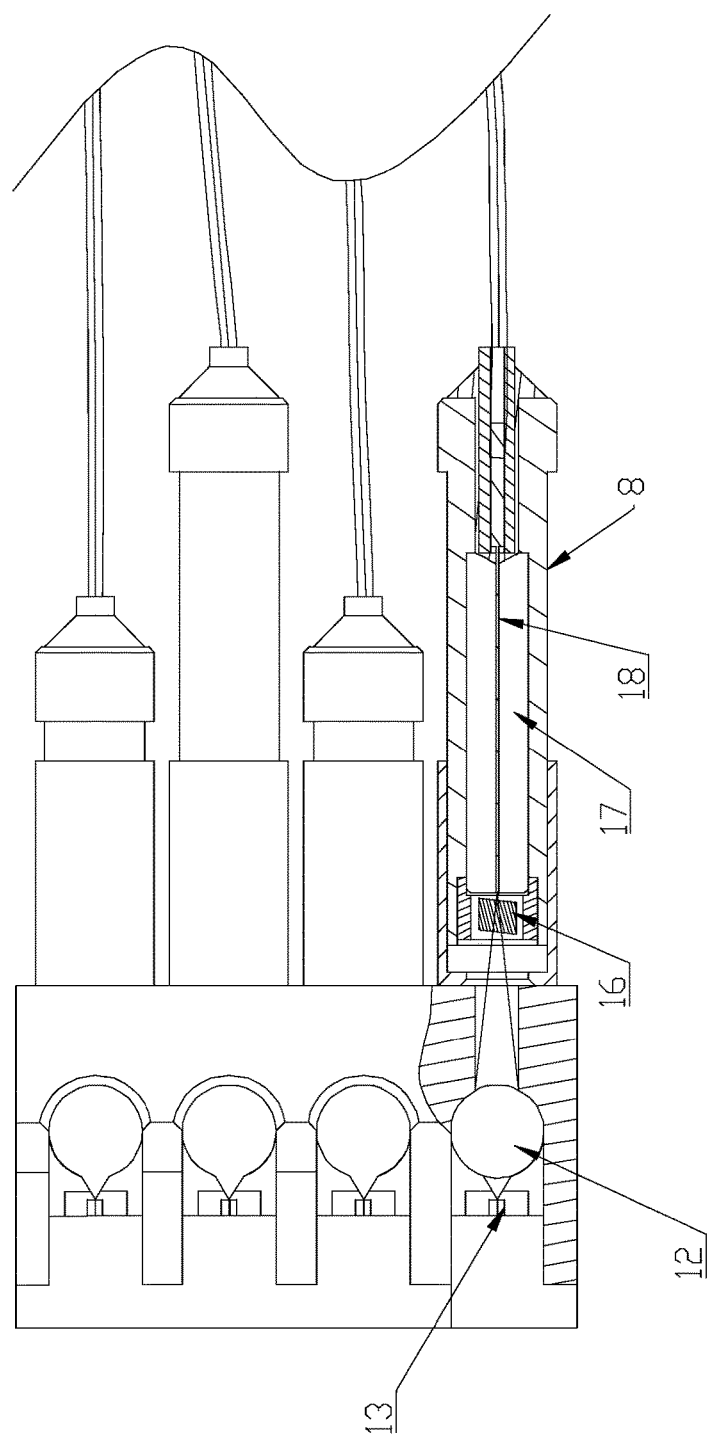
FIG. 5 is a cross-sectional view of a part of a base of the optical transceiver device according to one embodiment of the present disclosure.

The adjacent fiber pigtails 8 on the base 5 may be different in length as shown in FIG. 5. The distance between the fiber pigtails 8 in every light path on the base 5 of the present disclosure may be shortened with the structure in accordance with the present disclosure. The fiber pigtails 8 shorter in length may be coupled before the fiber pigtails 8 longer in length are coupled during coupling process.

The chip of clock data recovery and laser driving (CDR+LDD) 11 may be implemented by a CDR+LDD IC combo chip in one implementation. The chip of clock data recovery and amplification of received optical signal (CDR+TIA) 10 may be implemented by a CDR+TIA IC combo chip in another implementation.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. A multi-channel parallel optical transceiver module, comprising:
    a shell body and a circuit board located in the shell body;
    an optical emitter base soldered to a first end of the circuit board;
    a notch located on the optical emitter base for engaging the first end of the circuit board with the first end of the optical emitter base being soldered to two opposite sides of the circuit board;
    a plurality of optical emitters disposed in parallel on the optical emitter base, wherein at least two of the optical emitter of the plurality of optical emitters are separated from each other by a block;
    a plurality of lasers, each laser of the plurality of lasers disposed at a first side of an associated optical emitter of the plurality of optical emitters;
    a plurality of lenses, each lens of the plurality of lenses being associated with a laser of the plurality of lasers and disposed at the first side of an associated optical emitter of the plurality of optical emitters;
    a plurality of optical monitors, each optical monitor of the plurality of optical monitors disposed on a second end of the circuit board adjacent to an associated laser of the plurality of lasers, wherein each optical monitor is connected to an associated laser by a bonding wire, each optical monitor of the plurality of optical monitors and laser of the plurality of lasers being connected to a laser controller and a driving chip disposed on the circuit board;
    an optical fiber array and a processing chip for received optical signals adhered onto the circuit board;
    a first metal shielding mask disposed on the circuit board for covering and sealing the optical fiber array and the processing chip for the received optical signals; and a second metal shielding mask disposed on the circuit board, for covering and sealing the first metal shielding mask, the optical monitor, the laser controller, and the driving chip.

2. The multi-channel parallel optical transceiver module according to claim 1, further comprising a plurality of fiber pigtails, a plurality of ferrules, and a plurality of optical isolators, wherein each optical emitter of the plurality of optical emitters on the optical emitter base is associated with a fiber pigtail of the plurality of fiber pigtails, each fiber pigtail being disposed at a side of the base opposite from the circuit board, each optical isolator being disposed at one end of an associated fiber pigtail of the plurality of fiber pigtails adjacent to an associated lens of the plurality of lenses, each ferrule being disposed in an associated fiber pigtail of the plurality of fiber pigtails, and an optical fiber being disposed in each ferrule, with a light emitted from each laser passing through the associated lens and associated optical isolator before coupling to the optical fiber of the associated fiber pigtail.

3. The multi-channel parallel optical transceiver module according to claim 2, wherein each fiber pigtail of the plurality of fiber pigtails on the optical emitter base is different in length.

4. The multi-channel parallel optical transceiver module according to claim 1, wherein the laser controller and the driving chip are a chip for clock data recovery and laser driving, and the processing chip for the received optical signals is a chip for clock data recovery and amplification of the received optical signals.

* * * * *